United States Patent [19]

Caulfield et al.

[11] 4,429,954

[45] Feb. 7, 1984

[54] SPATIAL LIGHT MODULATOR AND PROCESS OF MODULATION

[75] Inventors: H. John Caulfield, Nagog Woods, Mass.; W. Thomas Cathey, Boulder, Colo.

[73] Assignee: Aerodyne Research, Inc., Billerica, Mass.

[21] Appl. No.: 203,568

[22] Filed: Nov. 5, 1980

[51] Int. Cl.³ .......................... G02F 1/29; G03H 1/22
[52] U.S. Cl. .................. 350/3.64; 350/3.86; 350/359
[58] Field of Search ............... 350/3.64, 3.67, 3.68, 350/361, 356, 3.62, 3.63, 3.66, 162.22, 362, 359, 393, 388; 365/216, 215, 234; 369/103, 109

[56] References Cited

U.S. PATENT DOCUMENTS

| 3,631,409 | 12/1971 | Buchan | 365/234 |
| 3,669,673 | 6/1972 | Ih et al. | 350/3.66 |
| 3,743,507 | 7/1973 | Ih et al. | 350/3.66 |
| 3,828,187 | 8/1974 | Winzer | 350/393 |

OTHER PUBLICATIONS

Huignard et al., "Time Average Holographic Interferometry . . . ", *Applied Optics*, vol. 16, No. 11, pp. 2796-2798, Nov. 1977.

Huignard et al., "Real-Time Coherent Edge Reconstruction . . . ", *Applied Optics*, vol. 17, No. 17, pp. 2671-2672, Sep. 1, 1978.

Lohmann; A. W. "Matched Filtering with Self-Luminous Objects", *Applied Optics* Mar. 1968, vol. 7, No. 3, pp. 561-563.

*Primary Examiner*—Bruce Y. Arnold
*Assistant Examiner*—William Propp
*Attorney, Agent, or Firm*—Frank A. Steinhilper

[57] ABSTRACT

Coherent light such as a laser beam is spatially modulated by causing it to interact at a photosensitive material such as a crystal with a focussed image of non-coherent light. An electric potential is applied to the crystal either transversely to the direction of the light or in line with the direction of the light according to either the Kerr effect or the Pockels effect. Typical crystals include Bismuth-silicon-oxide and strontium-barium-niobate.

35 Claims, 2 Drawing Figures

SPATIAL LIGHT MODULATOR AND PROCESS OF MODULATION

BACKGROUND OF THE INVENTION

One of the best known forms of spatial light modulation of coherent light is the hologram in which a beam of coherent radiation is brought together with a spatially modulated coherent beam, with the result that the information is imparted to the previously featureless beam by modulation in space rather than be impingement on a transparency or other object. Since the early days of holography many efforts have been made to achieve spatial light modulation having the characteristic of real time modulation or modulation which is contemporary with the events causing the modulation. In spite of the efforts to obtain real time, reusable spatial light modulation the only successes have been unwieldy in nature, generally poor in quality and extremely expensive in actual use. The purpose of the present invention is to provide a way in which a coherent beam can be modulated by an incoherent light pattern readily and inexpensively in real time for such things as pattern recognition, for detection of size or orientation of an oject or image, for image enhancement of the like.

GENERAL NATURE OF THE INVENTION

The present invention uses non-coherent light for the input of information to coherent radiation such as coherent light by forming from non-coherent light the equivalent of a focal-plane light hologram like the focal plane hologram which is formed when two beams of coherent light are brought together, the focal-plane hologram equivalent then being employed to generate an information-containing coherent beam.

In one embodiment, a focal-plane hologram equivalent is formed from non-coherent light and is used to add or subtract the information to or from a coherent beam which may be uniform or which may be previously modulated by some other pattern. The resulting hologram equivalent is then employed to generate a spatially-modulated coherent beam.

In another embodiment, a normal hologram such as a two-plane-wave hologram is formed and non-coherent light containing desired information is employed to provide input to the hologram for selective erasure from the hologram, resulting in a coherent beam diffracted from the unerased partion of the hologram from which the input information has been effectively removed or erased.

It has long been known that in certain photosensitive materials exposure to light or similar radiation while an electric charge is applied in a direction transverse to the direction of the light changes the refractive properties of the material. Typical materials known in the art are bismuth-silicon-oxide (known familiarly in the art as BSO) and strontium-barium-niobate (familiarly known as "strawberries"), and these and other similar materials are useful in the present invention. A number of similar materials are discussed in Optical Engineering (Volume 19 Number 5, pages 636ff). The use of some of these crystals in spatial light modulation is also discussed in Proc. IEEE (Volume 65 Number 1, pages 143ff). In all these prior uses, simple spatial light modulation of coherent light has not been satisfactorily accomplished with non-coherent light. In the prior work with spatial light modulation of coherent beams, such beams have been modulated in their entirety without information input, or information which is to be placed into a coherent beam has itself been contained in a coherent beam.

According to the embodiments of the invention illustrated in the Figures, information in non-coherent light or other non-coherent radiation is directed to a suitable material such as, for example, a crystal of BSO or the like, and is focussed therein while a suitable electric field is applied to the crystal. The non-coherent light may be visible light or invisible radiation of wave length either shorter or longer than that of visible light. As is known to those skilled in the art, the field is transverse to the direction of the light to obtain the Kerr effect, and the field is in the direction of the light to obtain the Pockels effect. In the manner hereinafter more fully described, the information originally in the input non-coherent light is thus written into or erased from the coherent beam.

The general nature of the invention having been set forth, the invention is more specifically described in connection with the drawings in which.

SPECIFIC DESCRIPTION OF THE INVENTION

Figure 1:
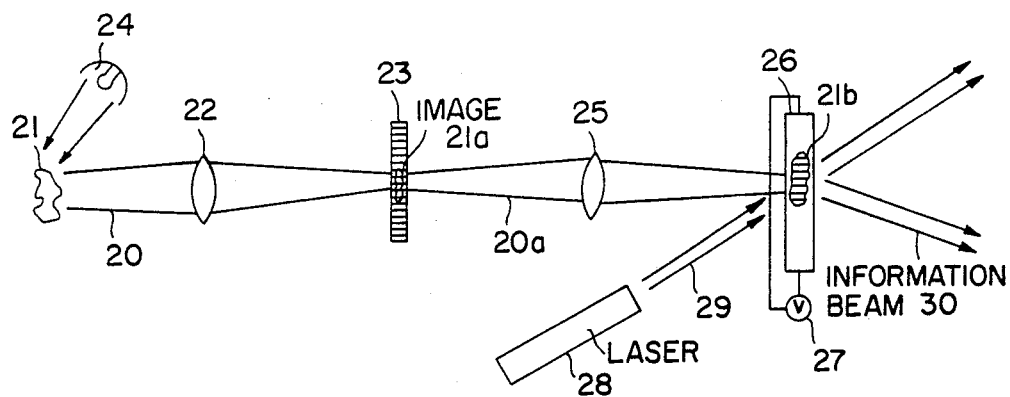
FIG. 1 is a diagrammatic illustration of one of the embodiments of the present invention.

FIG. 1 diagrammatically illustrates one embodiment of the invention in which non-coherent light 20 from a suitable light source (not shown) is reflected from or transmitted through an object 21 or other source of optical information which is to be imparted to coherent light. As illustrated, light 20 is focussed by lens 22 onto a fringe device 23 to form an image 21a of the object 21 within the fringe device 23. The fringe device 23 may be a grating or other element with an optical fringe pattern, and the focussed image 21a thereby is fringed in the same manner and with the same appearance as a focal-plane hologram formed with coherent light. Emerging from grating 23 is a beam 20a corresponding to a fringed image of the object 21. This fringed beam is in turn focussed by a lens 25 onto a crystal 26 having a potential applied thereto in a direction transverse to the direction of the beam 20a. The potential may be applied by any suitable means such as, for example, a voltage source applied to the edges of crystal 26.

In one embodiment of the invention, the crystal is bismuth-silicon-oxide, commonly known in the art as BSO. As illustrated in the Figure, within crystal 26 there is a focussed fringed image 21b of object 21 as the functional equivalent of a focal plane hologram of the object. The crystal with the transverse field as shown in FIG. 1 exhibits the Kerr effect, with an electric charge pattern within the crystal corresponding to the fringed light image 21b.

A coherent beam 29 from a laser 28 or other source of coherent light is directed to crystal 26, passing to the crystal at the location of image 21b. This results in an information-containing beam 30 from the crystal 26 in the manner of a true hologram. As can be seen, information corresponding to object 21 is thus imparted to coherent beam 29 where it meets crystal 26 and interacts with the effects of image 21b.

Figure 2:
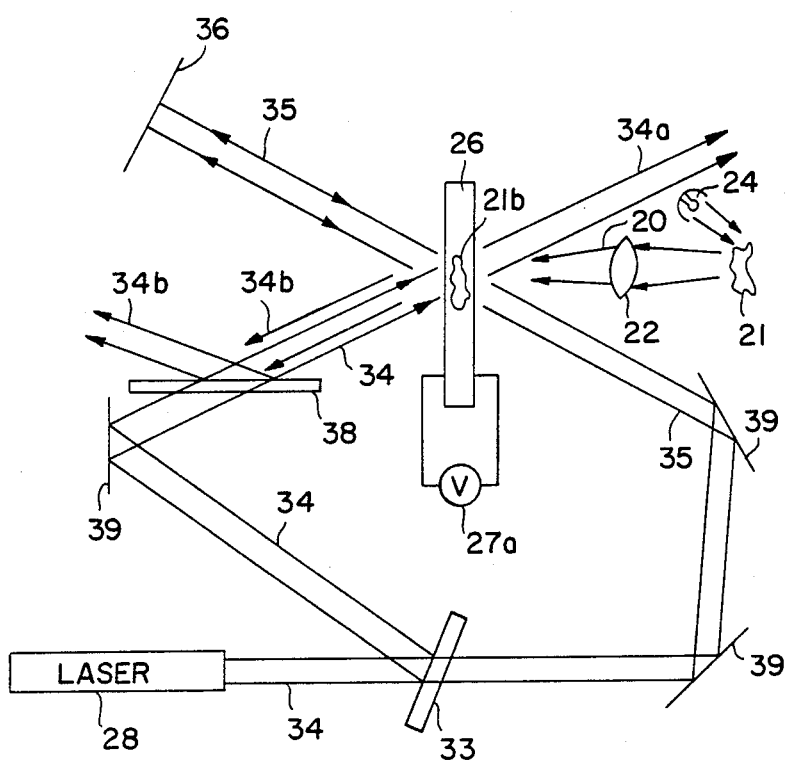
FIG. 2 is a diagrammatic illustration of another embodiment of the invention.

FIG. 2 illustrates diagrammatically a second embodiment of the invention in which a non-coherent light beam containing optical information is employed to impart information to a hologram. In this embodiment a normal hologram is formed in a photosensitive crystal 26 such as a crystal of BSO or the like and a non-coherent beam such as reflected or transmitted light from an object is focussed onto the hologram. In this FIG. 2, a hologram is formed in the usual manner by directing a coherent information beam 34 and a coherent reference beam to a crystal 26 such as a BSO crystal or the like. The coherent information beam 34 and the coherent reference beam 35 may be split from a beam of a single laser 28 with a beam splitter 33 and mirrors 39. One of the split beams may be reflected off an object 24 in the usual holographic manner. In the usual manner for 4-wave mixing, one beam from the hologram in crystal 26 emerges from the crystal and is directed to a mirror 36 and back to crystal 26. For convenience, the input beam 34a and the output beam 35b (a backward-propogating version of beam 34a) are shown side-by-side although they are travelling on the same path.

A beam of light 20 from object 21 is focussed on crystal 26 at the position of the hologram from coherent beams 34 and 35. A suitable electric potential is applied to the crystal 26 by a voltage source 26a. This potential is illustrated here in the direction of light in accordance with the Pockels effect. In this case, in crystal 26, the imaging of object 21 in crystal 26 together with the applied field alters the refraction of the coherent beams and thus erases the normal hologram in response to the image introduced into the crystal 26. Consequently, output beam 34b is spatially modulated by non-coherent beam 20. After emerging from crystal 26, output beam 34b is reflected off a beam splitter 38 and is collected or otherwise redirected in accordance with the practical application chosen for this embodiment of the invention.

The following example illustrates operation of the invention.

EXAMPLE 1

Apparatus is set up in conformity with the apparatus of FIG. 1. The object may be a paper target with a suitable image thereon: for demonstration of the invention, the image may be such as a relatively large capital "A" on paper. Paper is selected for purposes of illustration partly because it is inherently incompatible with coherent reflection of coherent light because of its notable scattering effect. The paper is illuminated by means of a slide projector (not shown) to obtain a relatively high light level. The image of the "A" is focussed on grating 23 which may, for example, be a coarse grating in the order of about 10 lines per millimeter. The resulting fringed image is in turn focussed on crystal 26. A presently preferred crystal is bismuth-silicon-oxide, generally known in the art as BSO. For operation according to the Kerr effect, a potential of about 3000 volts is applied across a crystal about one centimeter square and about three millimeters thick, the potential being applied transversely to the direction of the light. Laser 28 is a He-Ne laser emitting at 633 millimicrons. Information beam 30 is the shape of input beam 29 with the black or negative "A" of the image contained therein. Since the image of object 21 in this case is a bright image with a black area corresponding to the letter "A", the information beam is correspondingly a bright beam with a black "A" area.

The modulating information may be put into the system in accordance with the apparatus diagrammatically illustrated in FIG. 1 and may be played back or retrieved by turning off the illumination to object 21, as by shutting off the slide projector which illuminates the object, or by means of a shutter (not shown). The system will retain the information for playback for at least several hours, or the information may be retrieved immediately during real time.

There are many materials such as photosensitive or photoconductive crystals known for use as crystal 26, although materials other than crystals might also be used. The presently preferred material is bismuth-silicon-oxide, being preferred partly because it acts well in the invention and partly because it is commercially available in excellent quality. A similar material, bismuth-germanium-oxide is highly regarded in certain other countries, but is not readily available at this time in the United States. Strontium-barium-niobate is also quite satisfactory, but is less readily available. In addition, numerous other materials appear operable, such as zinc sulfide, potassium-dihydrogen-phosphate (known in the art as KDP) and deuterated KDP. Further it is expected that additional materials of this nature will become available inasmuch as holography is a dynamic art and materials for holography are appearing quite rapidly.

Both the Pockels effect and the Kerr effect can produce useful results in operation according to the invention. The actual potentials applied to crystal 26 will depend on the nature of the material in the crystal and on the geography, as well as on the degree of addition or erasure of information which is desired. Those skilled in the art are generally familiar with the desired electric potentials. In general, however, a potential in the order of about 3000 volts across a one centimeter crystal will produce good results in the embodiment shown in FIG. 1. This invention, further, is operable with virtually any of the usual configurations of holography, and the common characteristic is that in each case the result is to introduce modulation into a coherent beam form input in the form of non-coherent radiation.

We claim:

1. A method of spatial light modulation to impart information to a beam of coherent radiation from an input of non-coherent radiation, comprising
   imaging information-containing non-coherent radiation on a photosensitive crystal while applying an electric potential to said crystal to generate a pattern of electric charge within said crystal, and
   directing to said crystal at least one beam of coherent radiation,
   thus bringing about patternwise modification of refraction of said coherent beam.
2. The method of claim 1, wherein said crystal is bismuth-silicon-oxide.
3. The method of claim 1, wherein said crystal is barium-strontium-niobate.
4. The method of claim 1, wherein the potential applied to the crystal is transverse to the direction of radiation at said crystal.
5. The method of claim 1, wherein the potential applied to the crystal is in line with the direction of radiation at said crystal.
6. A method of spatial light modulation to impart information to a beam of coherent radiation from an input of non-coherent radiation, comprising
   forming a hologram of coherent radiation beams in a photosensitive crystal,
   imaging a beam of information-containing non-coherent radiation in said crystal in at least a portion of said hologram while applying an electric potential to said crystal, thereby modulating said hologram, and generating a coherent beam from said hologram modulated by the information of said information-containing non-coherent radiation.

7. The method of claim 6, wherein said crystal is bismuth-silicon-oxide.

8. The method of claim 6, wherein the potential applied to the crystal is transverse to the direction of radiation at said crystal.

9. The method of claim 6, wherein the potential applied to the crystal is in line with the direction of radiation at said crystal.

10. The method of claim 6, wherein said crystal is barium-strontium-niobate.

11. Apparatus for spatial modulation of coherent radiation comprising
a source of information intended for input into coherent radiation,
a photosensitive member adapted to exhibit modified refraction of radiation at areas of electric charge therein,
means to focus an optical image of said source of information into said photosensitive member, said means including a source of non-coherent radiation directed to said source of information to receive such information and means to focus said non-coherent radiation at said photosensitive member,
means to apply an electric potential across said photosensitive member, and
means to direct to said photosensitive member a beam of coherent radiation to which spatial modulation is to be imparted, said coherent beam being directed at least in part at the position of said focussed non-coherent radiation.

12. The apparatus of claim 11, wherein said photosensitive member is a crystal.

13. The apparatus of claim 12, wherein said crystal is bismuth-silicon-oxide.

14. The apparatus of claim 12, wherein said crystal is strontium-barium-niobate.

15. The apparatus of claim 11, wherein said electric potential is applied in a direction transverse to the direction of said radiation at the photosensitive member.

16. The apparatus of claim 11, wherein said electric potential is applied in a direction in line with the direction of said radiation at the photosensitive member.

17. The apparatus of claim 11, wherein sight radiation is visible light.

18. The apparatus of claim 11, wherein said radiation is non-visible light.

19. Apparatus for spatial modulation of coherent radiation comprising
a source of information for input into coherent radiation,
an optical grating,
a source of non-coherent radiation directed to said source of information to receive such information as modulation of said radiation,
means to focus said non-coherent radiation containing said information at said grating to form therein an image of said source of information,
a photosensitive member adapted to exhibit modified refraction of radiation at areas of electric charge therein,
means to focus at said photosensitive member an image of said grating including the imaged information to form in said photosensitive member a focal-plane hologram equivalent of said source of information,
means to apply an electric foeld to said photosensitive member, and
a source of coherent radiation and means to direct said coherent radiation to said photosensitive member in hologram configuration with respect to said focal-plane hologram equivalent, whereby information corresponding to said source of information is imparted to said coherent radiation.

20. The apparatus of claim 19, wherein said non-coherent radiation is visible light.

21. The apparatus of claim 19, wherein said non-coherent radiation is non-visible light.

22. The apparatus of claim 21, wherein said photosensitive member is a crystal of bismuth-silicon-oxide.

23. The apparatus of claim 21, wherein said photosensitive member is a crystal of strontium-barium-niobate.

24. Apparatus for spatial modulation of coherent radiation comprising
an object containing optical information for input into coherent radiation,
a crystal of a photosensitive material adapted to exhibit modified refraction of radiation at areas of electric charge therein,
means to illuminate said object with non-coherent radiation and to image said object at said crystal,
a hologram source comprising at least one laser, a beam splitter and reflection means to direct at least one split laser beam to said crystal in hologram configuration at the position of the image of said object, and
means to apply an electric field to said crystal.

25. The apparatus of claim 24, wherein said crystal is bismuth-silicon oxide.

26. The apparatus of claim 24, wherein said crystal is strontium-barium-niobate.

27. The apparatus of claim 24, wherein said laser is a neon-helium laser.

28. The apparatus of claim 24, wherein said electric field is applied transversely to th direction of radiation at said crystal.

29. Th apparatus of claim 24, wherein said electric field is applied in a direction in line with the direction of radiation at said crystal.

30. Apparatus for spatial modulation of coherent radiation by the interaction of non-coherent radiation therewith, comprising
a source of information for input into coherent radiation,
a source of non-coherent radiation directed to said source of information to produce non-coherent radiation containing information from said source of information,
a photosensitive member adapted to exhibit modified refraction of radiation at areas of electric charge therein,
means to establish an electric field at said photosensitive member,
means to focus said information-containing non-coherent radiation at said photosensitive member,
a source of coherent radiation to which spatial modulation is to be imparted,
means to direct said coherent radiation to said photosensitive member at the location therein of said focussed information-containing non-coherent radiation and to form a focal-plane hologram at said location,
whereby said coherent radiation is spatially modulated by said informatin-containing non-coherent radiation.

31. The apparatus of claim 30, wherein said photosensitive member is bismuth-silicon-oxide.

32. The apparatus of claim 30, wherein said photosensitive member is strontium-barium-niobate.

33. The apparatus of claim 30, wherein said electric field is transverse to the radiation at said photosensitive member.

34. The apparatus of claim 30, wherein said electric field is in line with the direction of said radiation at said photosensitive member.

35. The apparatus of claim 30, wherein said non-coherent radiation is visible light.

* * * * *